(12) United States Patent
Abhyanker

(10) Patent No.: US 8,095,430 B2
(45) Date of Patent: Jan. 10, 2012

(54) DEMAND AGGREGATION IN A GEO-SPATIAL NETWORK

(75) Inventor: Raj Vasant Abhyanker, Cupertino, CA (US)

(73) Assignee: Google Inc., Mountain View, CA (US)

(*) Notice: Subject to any disclaimer, the term of this patent is extended or adjusted under 35 U.S.C. 154(b) by 1186 days.

(21) Appl. No.: 11/784,137

(22) Filed: Apr. 4, 2007

(65) Prior Publication Data

US 2008/0250025 A1 Oct. 9, 2008

(51) Int. Cl.
G06Q 30/00 (2006.01)
G06F 17/30 (2006.01)

(52) U.S. Cl. .................. 705/26.41; 705/26.1; 705/26.2; 705/26.8

(58) Field of Classification Search ......... 705/26.1–27.2
See application file for complete search history.

(56) References Cited

U.S. PATENT DOCUMENTS

| | | | |
|---|---|---|---|
| 6,356,878 B1 | 3/2002 | Walker et al. | |
| 6,466,919 B1 * | 10/2002 | Walker et al. | 705/37 |
| 6,519,629 B2 | 2/2003 | Harvey et al. | |
| 6,604,089 B1 | 8/2003 | Van Horn et al. | |
| 6,631,356 B1 | 10/2003 | Van Horn et al. | |
| 6,985,879 B2 | 1/2006 | Walker et al. | |
| 7,103,565 B1 | 9/2006 | Vaid | |
| 7,124,107 B1 | 10/2006 | Pishevar et al. | |
| 7,797,193 B1 * | 9/2010 | Peyser et al. | 705/26.1 |
| 7,797,201 B2 * | 9/2010 | Mori et al. | 705/14.56 |
| 2001/0037257 A1 * | 11/2001 | Niki et al. | 705/26 |
| 2001/0049634 A1 * | 12/2001 | Stewart | 705/26 |
| 2001/0049636 A1 * | 12/2001 | Hudda et al. | 705/26 |
| 2002/0023018 A1 | 2/2002 | Kleinbaum | |
| 2003/0004802 A1 * | 1/2003 | Callegari | 705/14 |
| 2005/0038713 A1 * | 2/2005 | Pickard et al. | 705/26 |
| 2006/0047598 A1 | 3/2006 | Hansen | |
| 2006/0085259 A1 | 4/2006 | Nicholas et al. | |
| 2006/0089882 A1 * | 4/2006 | Shimansky | 705/26 |
| 2007/0005377 A1 * | 1/2007 | Cherry | 705/1 |
| 2007/0150375 A1 * | 6/2007 | Yang | 705/26 |
| 2008/0082420 A1 * | 4/2008 | Kargman et al. | 705/14 |
| 2008/0162267 A1 * | 7/2008 | Wolf | 705/10 |
| 2010/0153198 A1 * | 6/2010 | Murphy et al. | 705/14.15 |

OTHER PUBLICATIONS

"Terion announces FlletView product enhancement—Active Geofencing". Nov. 30, 2004. Business Wire.*
Unitedbuyingclubs.com—For United Natural Foods Buying Clubs, http://www.unitedbuyingclubs.com/index.htm.
International Search Report issued Sep. 4, 2008 in corresponding PCT/US07/08637.

* cited by examiner

*Primary Examiner* — William Allen

(57) ABSTRACT

A method, apparatus, and system of demand aggregation in a geo-spatial network are disclosed. In one embodiment, a method includes creating an item group associated with a registered user of a geo-spatial network, inviting a set of neighboring users geo-spatially proximate to the registered user to join the item group, placing at least one of the set of neighboring users as a member of the item group and/or communicating items of the item group to a set of providers of the items of the item group. The method may includes placing a good and/or a service in the item group, and/or generating a frequency data, a pricing data, a unit data, and/or a time data. The method may further include geo-fencing the item group in an area that encompasses a neighborhood community in a threshold geographical radius from the registered user who creates the item group.

12 Claims, 12 Drawing Sheets

FIGURE 4

| ITEM GROUP 802 | ITEMS 804 | FREQUENCY DATA 806 | PRICING DATA 808 | UNIT DATA 810 | TIME DATA 812 |
|---|---|---|---|---|---|
| BANANITES | BANANAS | BI-WEEKLY | 29C/POUND | 6 POUNDS | 12 MONTHS |
| WINE LOVERS | BERINGER WINE | MONTHLY | $3/BOTTLE | 10 CRATES | 18 MONTHS |
| • | • | • | • | • | • |
| • | • | • | • | • | • |
| • | • | • | • | • | • |

DEMAND AGGREGATION IN A GEO-SPATIAL NETWORK

This patent application is being filed simultaneously with an international PCT patent application, titled "DEMAND AGGREGATION IN A GEO-SPATIAL NETWORK."

FIELD OF TECHNOLOGY

This disclosure relates generally to the technical fields of communications and, in one example embodiment, to a method, apparatus, and system of demand aggregation in a geo-spatial network.

BACKGROUND

A resident (e.g., an individual, a family, a tenant, a homeowner, etc.) may periodically purchase certain goods (e.g., groceries, fruits, paper, bottled water, newspapers, magazines, etc.) and/or services (e.g., car-wash, laundry services, etc.) from a merchant and/or a service provider (e.g., a local store). Needs for the goods and/or services of the resident may depend on things such as a season (e.g., summer, winter, etc.), a preference (e.g., certain vegetables, fruits, meats, etc.), and/or other reasons (e.g., age, health conditions, etc.).

The resident may discover common purchasing habits (e.g., from the same shop, same brand, same frequency, etc.) with neighbors when interacting with them (e.g., at local merchants, service providers, and/or social events). For example, John (e.g., the resident) may occasionally meet Jackie (e.g., a neighbor) at a point of purchase (e.g., a shopping mall, a grocery store, a flea market, etc.) and discover common buying habits of purchasing bananas and bottled water every Saturday morning.

There may be a number of other neighbors of John (e.g., the resident) and Jackie (e.g., the neighbor) who also buy bananas and bottled water every Saturday morning. It may be difficult for John, Jackie and the other neighbors to pool their assets and purchase bananas and bottled water together because managing finances and coordinating distribution can be cumbersome and difficult. For example, John, Jackie, and other neighbors may communicate with each other and decide to form a plan of taking turns alternate Saturdays in buying bananas and bottled water to save time, effort and money. However, this process may necessitate good understanding, cooperation and/or commitment by each participant of the plan. In addition, some of the neighbors may not even know each other and may be unaware that they also buy similar items each week.

This plan may run into challenges when someone fails to meet a commitment and/or the expectations of their neighbors (e.g., Jackie might be out of town on her weekend and may be unable to fulfill her commitment). In addition, settling payment terms by way of exchange of cash and/or checks can be difficult. A person who collects checks (e.g., John) may have to wait for the next opportunity to go to a bank, fill in forms, and deposit the checks manually. If John misplaces a check somehow, he may undergo a financial loss.

Managing the amounts owed to and to be paid by neighbors can be difficult. In addition, coordinating tasks can take more time than each neighbor just individually buying the goods and/or services on their own. As a result, the neighbors may not realize savings of time, energy and money in aggregating demand for the periodically purchased goods and/or services.

SUMMARY

A method, apparatus and system of demand aggregation in a geo-spatial network are disclosed. In one aspect, a method includes creating an item group associated with a registered user of a geo-spatial network, inviting a set of neighboring users geo-spatially proximate to the registered user to join the item group, placing a set of neighboring users as a member of the item group, and communicating items of the item group to a set of providers of the items of the item group.

The method may further include placing in the item group at least one of a good (e.g., a food product, a perishable, a consumable, a household item, a commodity, a beverage, a fruit, a bread, a meat, a paper product, a tool, a medicine, a plastic product, a health related product, etc.) and a service (e.g., car-wash services, cleaning services, food services, and/or other residential services), and generating a frequency data indicating a periodicity at which each item in the item group is demanded by the registered user.

The method may also include generating a pricing data indicating a monetary amount the registered user is willing to provide for each item in the item group, generating a unit data indicating a quantity the registered user demands in each request and generating a time data indicating how long the set of providers are to provide the items in the item group to members of the item group.

In addition, the method may include geo-fencing (e.g., a street, a neighborhood, a city, and a county) the item group in an area that encompasses a neighborhood community in a threshold geographical radius from the registered user who creates the item group. Also, the method may include listing the item group as one of a set of buying groups separately represented from a set of social groups in a geo-spatial social network embodying the set of buying groups and the set of social groups. The method may further include creating a bidding system among the set of providers of the items of the item group in which the set of providers have a time constrained auction system to provide commitments of price, schedule, and/or delivery of items of the item groups to the registered user and/or the at least one of the neighboring users geo-spatially proximate to the registered user.

Additionally, the method may include transforming an elected member of the item group to a moderator of the item group, such that the moderator syndicates the item group with other item groups in the geo-spatial network such that the set of providers simultaneously bid to fulfill commitments to the item group and/or other item groups in the syndicate. The method may include providing a moderator interface such that the moderator may choose which bids of the number of providers qualify as providers of items to members of the item group.

The method may also include processing a payment information from each member of the item group prior to communicating items of the item group to the set of providers such that each member commits to procuring items in the item group when a winning provider is identified. Moreover, the method may include identifying the winning provider through at least one of an open auction system, a closed auction system, a dutch auction system, a reverse auction system, and a first to commit to a service level identified in the item group system.

In addition, the method may include providing a voting interface to members of the item group such that the winning provider may be determined based on a voted one or more of the set of providers. The method may further include automatically providing a fulfillment and tracking engine to members of the item group and to the winning provider, such that the parties see a delivery status of items of the item group through the geo-spatial network. Additionally, the fulfillment may be provided to at least one of a central depot in a neighborhood location convenient to members of the item group and/or to individual residences of members of the item group In another aspect, a method includes placing a bid of providing goods and/or services to a neighborhood buying consortia of a geo-spatial social network, debiting accounts of the members of the neighborhood buying consortia based on a contract formed when the bid forms the contract with members of the neighborhood buying consortia, and automatically generating a route to deliver the goods and/or services to members of the neighborhood buying consortia.

The method may further include providing an aggregate contract price based on demand of the neighborhood buying consortia and other neighborhood buying consortia forming a coalition with each other through the geo-spatial social network in procuring the goods and/or services. Also, the method may include generating in the route a driving directions, a walking map, and/or a commuting map between a merchant and members of the buying consortia.

In yet another aspect, a system includes a customer grouping module to place a set of users of a social network (e.g., the social network may be a wiki based social network in which individual users share and/or edit information about unregistered and/or registered users of the social network until the unregistered users and/or the registered users claim their profiles and mark them as being private) having a common procuring interest in a shopping group, a distribution module to automatically create a driving map between a set of providers and a set of members of the shopping group, and an advertising module to pre-qualify the shopping group to the set of providers based on at least one of an income, a frequency, a cost, and a location of the members of the shopping group. Furthermore, the set of providers may provide items to the set of members of the shopping group, and/or may deliver the items through a physical mail based on a direct mail address associated with each user of the social network. The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a user interface view of the auction module of FIG. 1, according to one embodiment.

FIG. 8 is a table view showing demand details associated with the item groups in the geo-spatial network.

DETAILED DESCRIPTION

A method, apparatus and system of demand aggregation in a geo-spatial network are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes creating an item group associated with a registered user (e.g., the registered user 136 of FIG. 1) of a geo-spatial network (e.g., a social network in a geo-spatial environment), inviting a set of neighboring users geo-spatially proximate to the registered user to join the item group, placing the set of neighboring users as a member of the item group, and/or communicating items of the item group to a set of providers (e.g., the distributors 128 of FIG. 1) of the items of the item group.

Figure 1:
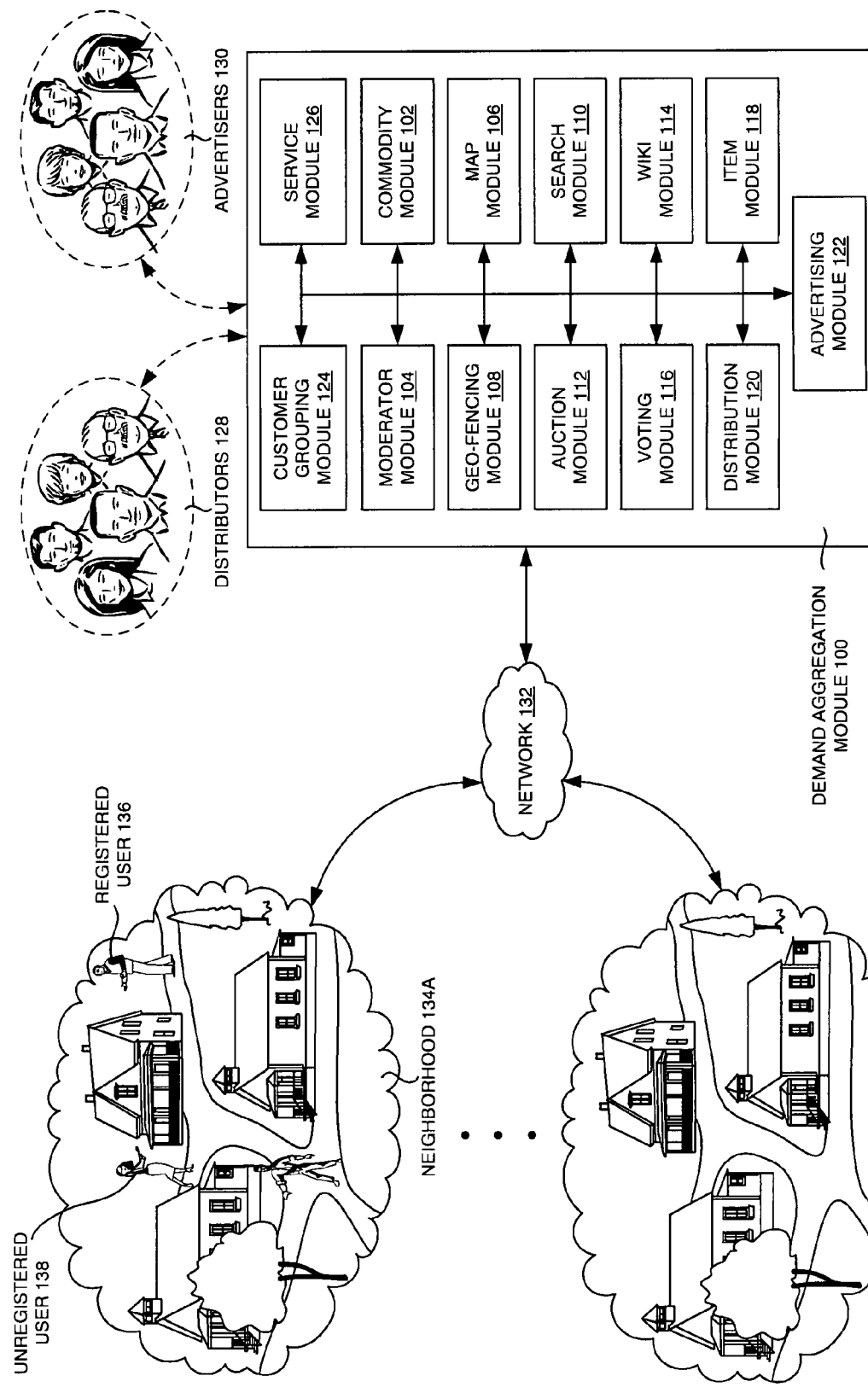
FIG. 1 is a system view of a demand aggregation module communicating with neighborhoods through a network, according to one embodiment.

In another embodiment, a method includes placing a bid of providing goods and/or services to a neighborhood buying consortia of a geo-spatial social network (e.g., through the auction module 112 of FIG. 1), debiting accounts of members of the neighborhood buying consortia based on a contract formed when the bid forms the contract with members of the neighborhood buying consortia, and automatically generating a route (e.g., by creating a driving map using the distribution module 120 of FIG. 1) to deliver the goods and/or services to members of the neighborhood buying consortia.

In yet another embodiment, a system includes a customer grouping module (e.g., the customer grouping module 124 of FIG. 1) to place a set of users of a social network having a common procuring interest in a shopping group, a distribution module (e.g., the distribution module 120 of FIG. 1) to automatically create a driving map between a set of providers and a set of members of the shopping group, and/or to deliver the items through physical (e.g., postal, courier, etc.) mail based on a direct mail address associated with each other of the social network, and an advertising module (e.g., the advertising module 122 of FIG. 1) to pre-qualify the shopping group to the set of providers (e.g., based on an income, a frequency, a cost, and/or a location of the members of the shopping group, etc.).

FIG. 1 is a system view of a demand aggregation module 100 communicating with neighborhoods 134A-N through a network 132, according to one embodiment. Particularly, FIG. 1 illustrates the demand aggregation module 100, a commodity module 102, a moderator module 104, a map module 106, a geo-fencing module 108, a search module 110, an auction module 112, a wiki module 114, a voting module 116, an item module 118, a distribution module 120, an advertising module 122, a customer grouping module 124, a service module 126, distributors 128, advertisers 130, the network 132, and the neighborhoods 134A-N, a registered user 136, an unregistered user 138, according to one embodiment.

The demand aggregation module 100 may group neighborhood users of a geo-social network based on common procuring interests of the neighborhood users and/or may provide an aggregate contract price based on demand of an item group associated with a registered user 136 in the geo-spatial network. The commodity module 102 may generate items to be placed in the item group associated with the registered user 136 of the geo-spatial network. The moderator module 104 may provide a moderator interface that enables a moderator of the item group to choose bids associated with providers of items to the item group.

The map module 106 may generate map data (e.g., visualizations) which includes a neighborhood community displaying various item groups associated with registered user 136 of the geo-spatial network. The geo-fencing module 108 may encompass the item group in an area which covers a threshold geographical radius (e.g., ten miles) from the registered user 136 who creates the item group. The search module 110 may enable searching of the set of providers of the goods and/or services, the item groups and/or the neighborhood buying consortia in the geo-spatial network. The auction module 112 may generate a time constrained auction system to provide commitments of price, schedule, and/or delivery of items of the item group to the registered user 136 and/or neighboring users (e.g., the unregistered user 138 of FIG. 1) by the set of providers in the geo-spatial network.

The wiki module 114 may provide an interface to enable users in the neighborhoods 134A-N to share and/or edit information about the unregistered user 138 and/or the registered user 136 of the geo-spatial network until the unregistered user 138 and/or the registered user 136 claims their profile and marks them as being private. The voting module 116 may provide a voting interface to the member(s) of the item group to identify a winning provider (e.g., a merchant). The item module 118 may place the items (e.g., goods and/or services) in the item group in the geo-spatial network and may generate a data (e.g., a frequency data, a unit data, a pricing data, and/or a time data, etc.) associated with the items of the item group.

The distribution module 120 may generate driving directions to enable the provider(s) of the item(s) to deliver goods and/or services to a central depot in a neighborhood location and/or individual residences of the members in the neighborhoods 134A-N. The advertising module 122 may help the set of providers to prequalify the item group associated based on various criteria (e.g., an income, a frequency, a cost, etc.). The customer grouping module 124 may enable creation of the item group associated with the registered user 136 of the geo-spatial network based on common procuring interests.

The service module 126 may generate services (e.g., car-wash services, residential services, etc.) to be offered to the members of the item group in the geo-spatial social network. The distributors 128 may be a set of providers (e.g., a merchant, a retailer, etc.) of the items who provides the goods and/or services to the members of various item groups in the geo-spatial social network. The advertisers 130 may be entities who promote common interest between the item groups and the set of providers in the geo-spatial social network. The network 132 may enable the members of the item group to communicate with neighboring users and the set of providers to procure the goods and/or services.

The neighborhoods 134A-N may be geographically localized communities (e.g., a larger city, a town, a suburb, etc.) consisting of the registered user(s) 136 and the unregistered user(s) 138 of the geo-spatial social network. The registered user 136 may be an entity associated with creating the item group(s) based on a common procuring interest of the neighboring users geo-spatially proximate to the registered user 136. The unregistered user 138 may be an entity who is not a registered member of the geo-spatial social network.

In the example embodiment illustrated in FIG. 1, the demand aggregation module 100 communicates with the neighborhoods 134A-N through the network 132. The demand aggregation module 100 also communicates with the distributors 128 and the advertisers 130. The demand aggregation module 100 contains the commodity module 102, the moderator module 104, the map module 106, the geo-fencing module 108, the search module 110, the auction module 112, the wiki module 114, the voting module 116, the item module 118, the distribution module 120, the advertising module 122, the customer grouping module 124, and the service module 126 (e.g., interacting with each other).

An item group associated with the registered user 136 of the geo-spatial network may be created. A set of neighboring users (e.g., geo-spatially proximate to the registered user 136) may be invited to join the item group. In addition, the set of neighboring users may be placed as a member of the item group. The items of the item group may be communicated to the set of providers (e.g., the distributors 128 of FIG. 1) of the items of the item group. A good (e.g., a food product, a perishable, a consumable, a household item, a commodity, a beverage, a fruit, a bread, a meat, a paper product, a tool, a medicine, a plastic product, and/or a health related product, etc.) and/or a service (e.g., car-wash services, cleaning services, food services, and/or other residential services, etc.) may be placed in the item group.

The frequency data may be generated indicating a periodicity at which each item in the item group is demanded by the registered user 136. The pricing data may be generated indicating a monetary amount (e.g., that the registered user 136 is willing to provide for each item in the item group). The unit data may be generated indicating a quantity (e.g., that the registered user 136 demands in each request). The time data may be generated indicating, for example, how long the set of providers (e.g., the distributors 128 of FIG. 1) are to provide the items in the item group to the members of the item group.

The item group may be geo-fenced (e.g., to a street, a neighborhood, a city, and/or a county) in an area that encompasses a neighborhood community in a threshold geographical radius (e.g., ten miles) from the registered user 136 who creates the item group. In addition, the item group may be listed as one of a set of buying groups separately represented from a set of social groups in the geo-spatial social network embodying the set of buying groups and the set of social groups.

A bidding system may be created among the set of providers (e.g., the merchants) of the items of the item group in which the set of providers have a time constrained auction system to provide commitments of price, schedule, and/or delivery of items of the item groups to the registered user 136 and/or the set of the neighboring users geo-spatially proximate to the registered user 136. An elected member of the item group may be transformed to a moderator of the item group, such that the moderator syndicates the item group with other item groups in the geo-spatial network such that the set of providers simultaneously bid to fulfill commitments to the item group and/or the other item groups in the syndicate.

A payment information may be processed from each member of the item group prior to communicating items of the item group to the set of providers such that each member commits to procuring items in the items group when the winning provider is identified. For example, the winning provider may be identified through an open auction system, a closed auction system, a dutch auction system, a reverse auction system, and/or a first to commit to a service level identified in the item group system, etc.

A fulfillment and tracking engine may be provided automatically to the members of the item group and to the winning provider, such that the parties see a delivery status of items of the item group through the geo-spatial network. A bid (e.g., of providing the goods and/or services) may be placed to a neighborhood buying consortia of the geo-spatial social network. The accounts of the members of the neighborhood buying consortia may be debited (e.g., based on a contract formed when the bid forms the contract with the members of the neighborhood buying consortia).

A route may be generated automatically (e.g., by creating the driving direction using the distribution module 120 of FIG. 1) to deliver the goods and/or services to the members of the neighborhood buying consortia. The aggregate contract price may be provided based on demand of the neighborhood buying consortia and/or other neighborhood buying consortia forming a coalition with each other through the geo-spatial social network in procuring the goods and/or services. A driving directions, a walking map, and/or a commuting map between a merchant (e.g., the distributors 128 of FIG. 1) and the members of the buying consortia may be generated in the route.

The customer grouping module 124 may place a set of users of a social network having a common procuring interest in a shopping group. The distribution module 120 may automatically create a driving map between the set of providers (e.g., who provides items to the set of members of the shopping group) and the set of members of the shopping group to deliver the items through a physical mail (e.g., postal, courier, etc.) based on a direct mail address associated with each user of the social network (e.g., a wiki based social network in which individual users share and/or edit information about the unregistered and/or the registered users of the social network until the unregistered users and/or the registered users claim their profiles and mark them as being private). The advertising module 122 may pre-qualify the shopping group to the set of providers (e.g., based on an income, a frequency, a cost, and/or a location of the members of the shopping group).

Figure 2:
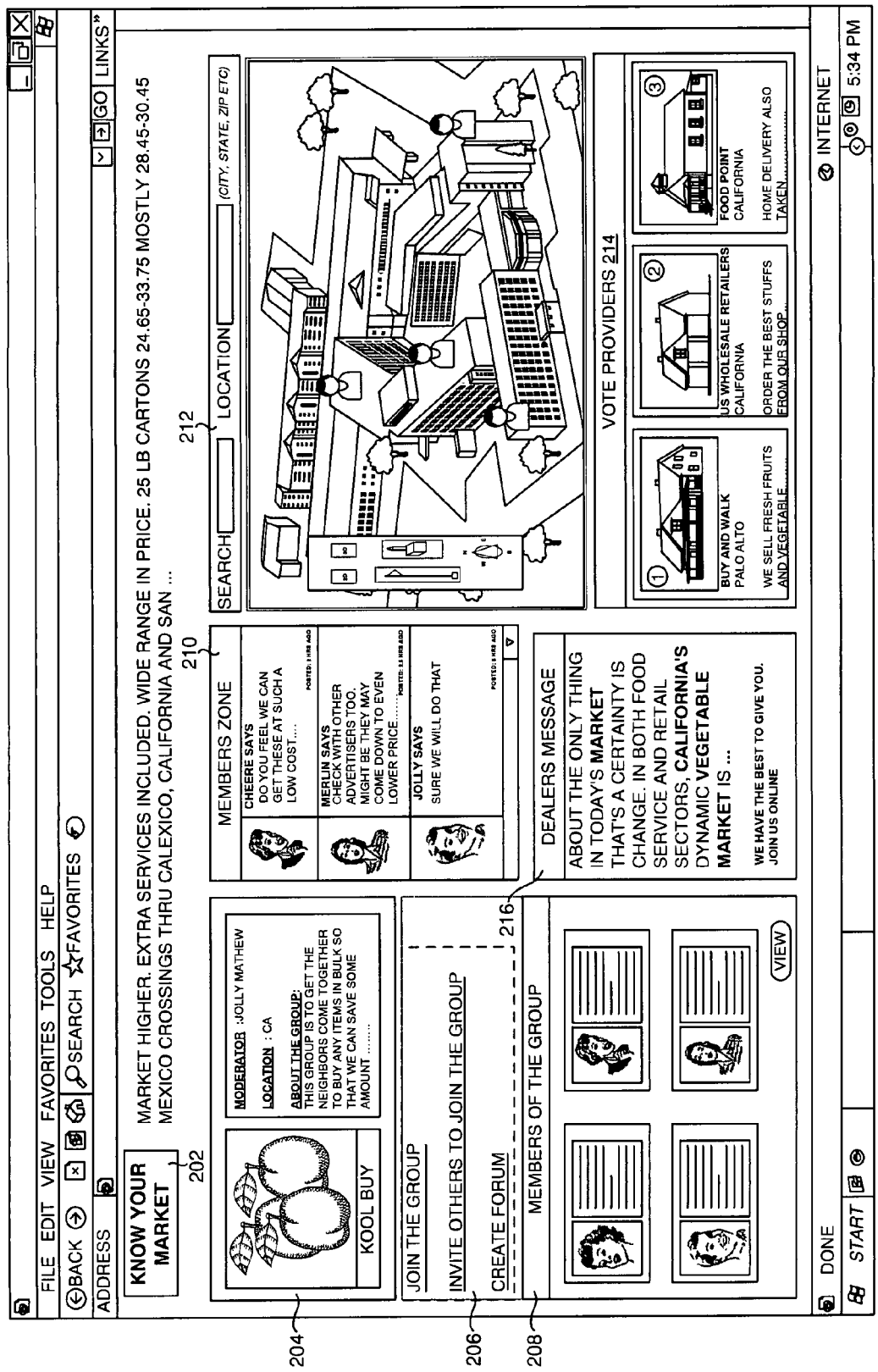
FIG. 2 is a user interface view of the customer group module of FIG. 1, according to one embodiment.

FIG. 2 is a user interface view 200 of the customer grouping module 124 of FIG. 1, according to one embodiment. Particularly, FIG. 2 illustrates a know your market option 202, a group info option 204, a join the group option 206, a members of the group option 208, a members zone 210, a map view 212, a vote providers option 214 and a dealers message option 216, according to one embodiment.

The know your market option 202 may enable the member of the item group to know a market condition and a projected price line of various items in the market. The group info option 204 may offer information (e.g., name of the moderator, name of a group, location, etc.) associated with the item group in the geo-spatial social network. The join the group option 206 may allow the neighborhood users to join the item group based on their shopping interests. The members of the group option 208 may display profile information associated with the members of the item group in the geo-spatial network.

The members zone 210 may enable the members of the item group to communicate with the set of providers, the moderator of the items and/or the neighboring users, post opinions about bidding, discuss pricing data, etc. The map view 212 may visualize an aerial map view representing locations of the members and the set of providers of items of the item group in the geo-spatial network. The map view 212 may also enable the merchant (e.g., the distributor 128 of FIG. 1) to visualize a route in the map to deliver the goods and/or services to the members of the item group. The vote providers option 214 may enable the members of the item group to vote on a set of providers to identify a winning provider of an item group through the voting interface. The dealers message option 216 may display advertisements, messages and/or offers provided by the set of providers to the members of the item group.

In the example embodiment illustrated in FIG. 2, the user interface view 200 may enable the members of the item group to invite the neighboring users to join the group. In addition, the user interface view 200 may enable the set of providers to visualize the delivery route in the map. The user interface view 200 may enable the member of the item group to select the winning provider of items through the voting interface. The members of the item group may also share thought and/or comments about the set of providers of goods and/or services. The voting interface may be provided to the members of the item group such that the winning provider is determined based on a voted one or more of the set of providers.

Figure 3:
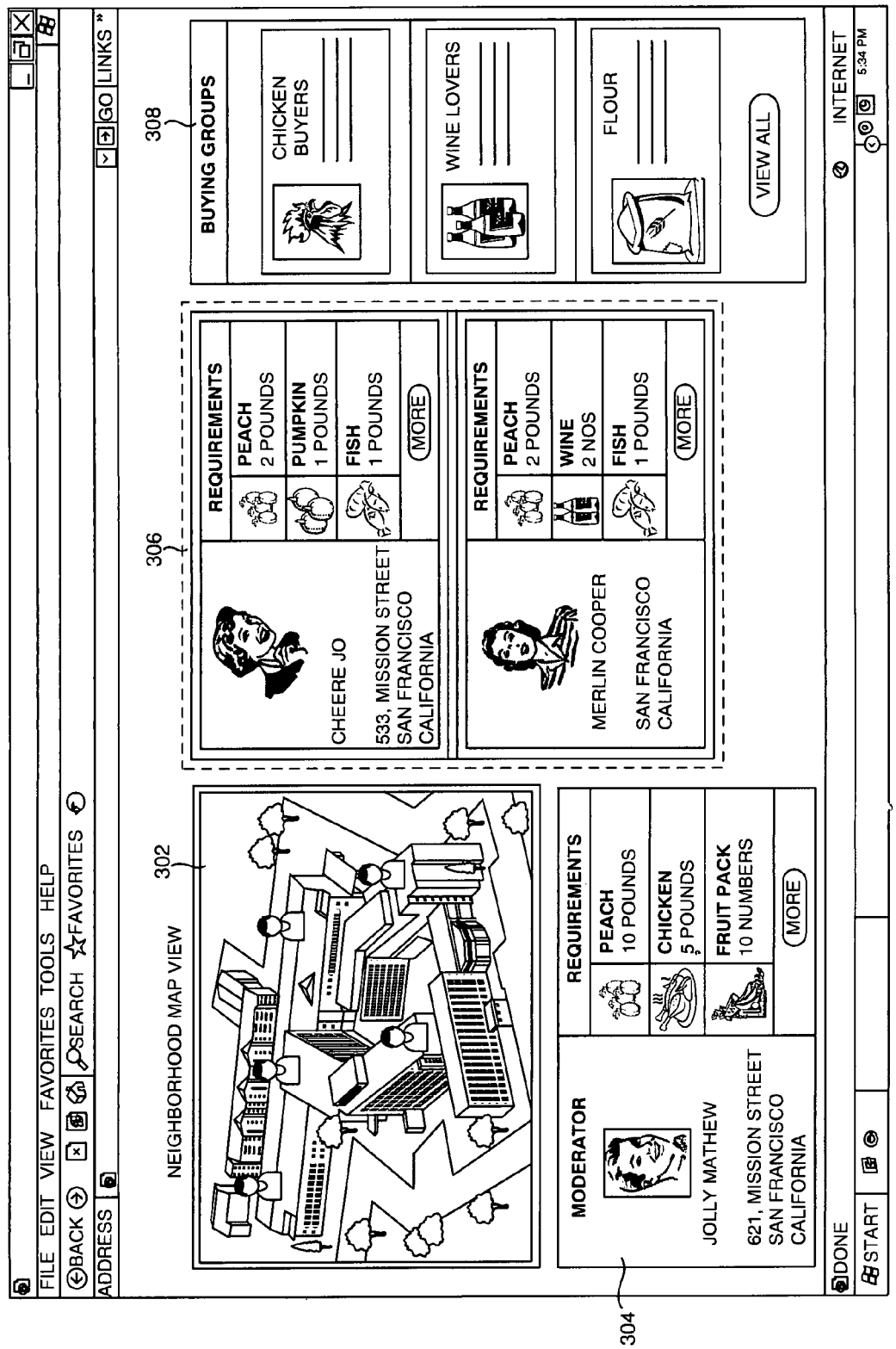
FIG. 3 is a user interface view illustrating requirements of the members of the item group in the geo-spatial network, according to one embodiment.

FIG. 3 is a user interface view 300 illustrating requirements of the members of the item group in the geo-spatial network, according to one embodiment. Particularly, FIG. 3 illustrates a neighborhood map view 302, moderator requirements 304, member requirements 306 and a buying groups 308, according to one embodiment.

The neighborhood map view 302 may display the residents and/or the businesses associated with the neighborhood users (e.g., the neighborhood users may be geo-spatially proximate to the registered user in the item group on whose request the neighborhood users join the item group in the geo-spatial environment) and the members of the item group on a map. The moderator requirements 304 may display the goods and/or services required by the moderator of the item group in the geo-spatial network. The member requirements 306 may display various shopping demands placed in the item group by the members of the item group in the geo-spatial social network.

The buying groups 308 may display a set of buying groups in a geo-fenced area associated with the neighborhood (e.g., the neighborhoods 134A-N of FIG. 1) in the geo-spatial social network. In the example embodiment illustrated in FIG. 3, the user interface view 300 may enable the members and the moderator of the item group and the set of providers to view the demands of the members and the moderator of the item group in the geo-spatial network. The user interface view 300 may enable the member of the item group to visualize the set of the buying groups in the geo-fenced area of the geo-spatial social network through the buying groups 308.

Figure 4:
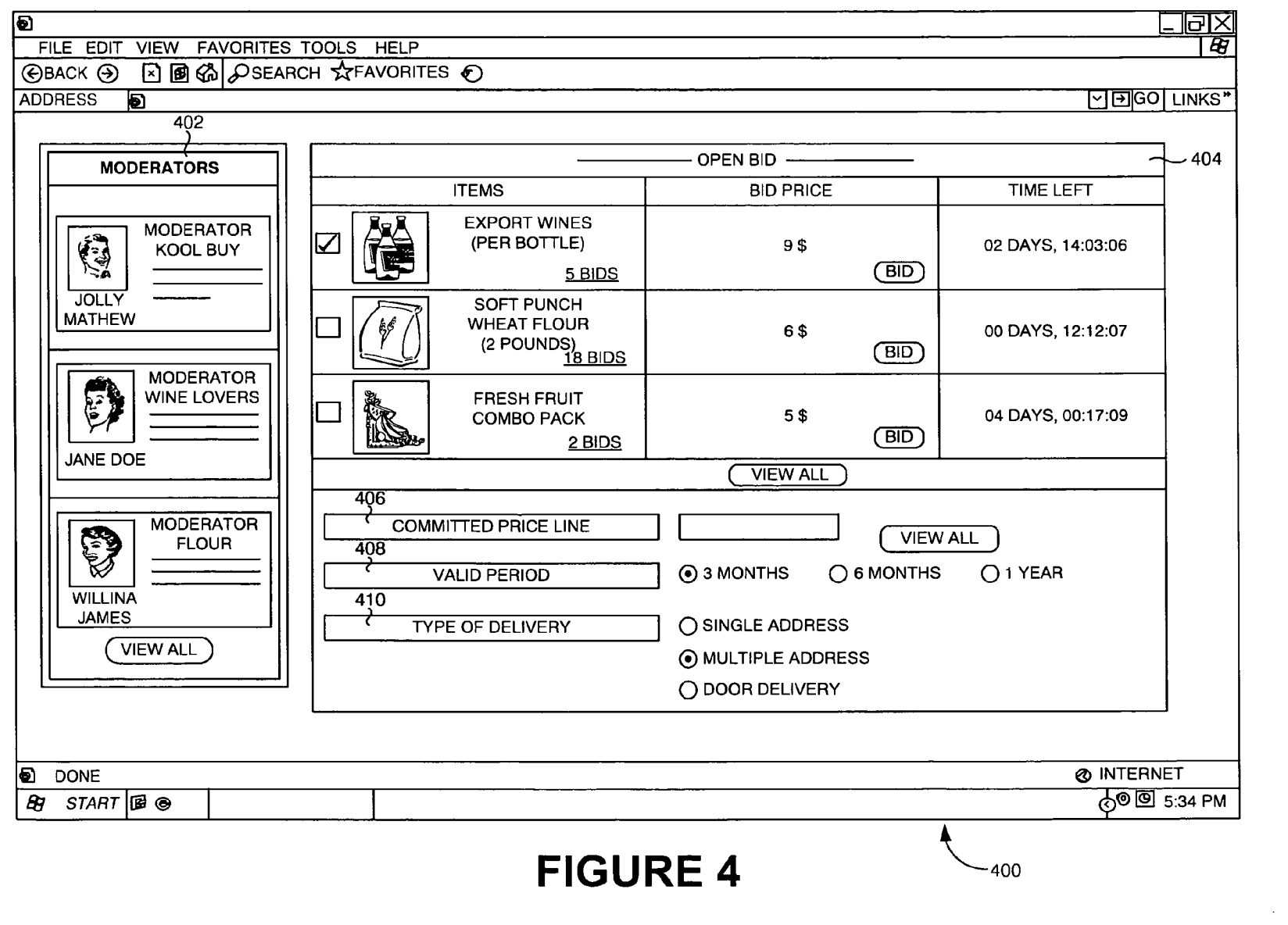

FIG. 4 is a user interface view 400 of the auction module 112 of FIG. 1, according to one embodiment. Particularly, FIG. 4 illustrates moderators 402, an open bid option 404, a committed price line option 406, a valid period option 408 and a type of delivery option 410, according to one embodiment.

The moderators 402 may enable the set of providers and the members of the item group to view the information associated with the moderators representing the different item groups in the geo-spatial social network. Each item group may have their moderator elected by the members of the group. The open bid option 404 may enable the set of providers of items to bid for consideration to be one of the providers of items to the member of the item group (e.g., based on the inputs provided by the moderator). The committed price line option 406 may enable members and/or a set of providers to view a price line committed by the members of the item group. The valid period option 408 may display a time duration for which the set of providers will provide the goods and/or services to the members of the item group. The type of delivery option 410 may offer details about the delivery location of the goods and/or services demanded by the members of the item group. The delivery location of the items may be the individual residences of the members of the item group and/or a central depot in the neighborhood location convenient to the members of the item group.

In the example embodiment illustrated in FIG. 4, the user interface view 400 may enable the moderators of the buying group to set a minimum bid for each item. Also, the user interface view 400 displays the duration (e.g., for which the goods and/or services will be provided by the providers), the pricing data, the delivery route, etc. The moderator interface may be provided such that the moderator chooses to select bids for identifying the winning provider of items to the items group.

Figure 5:
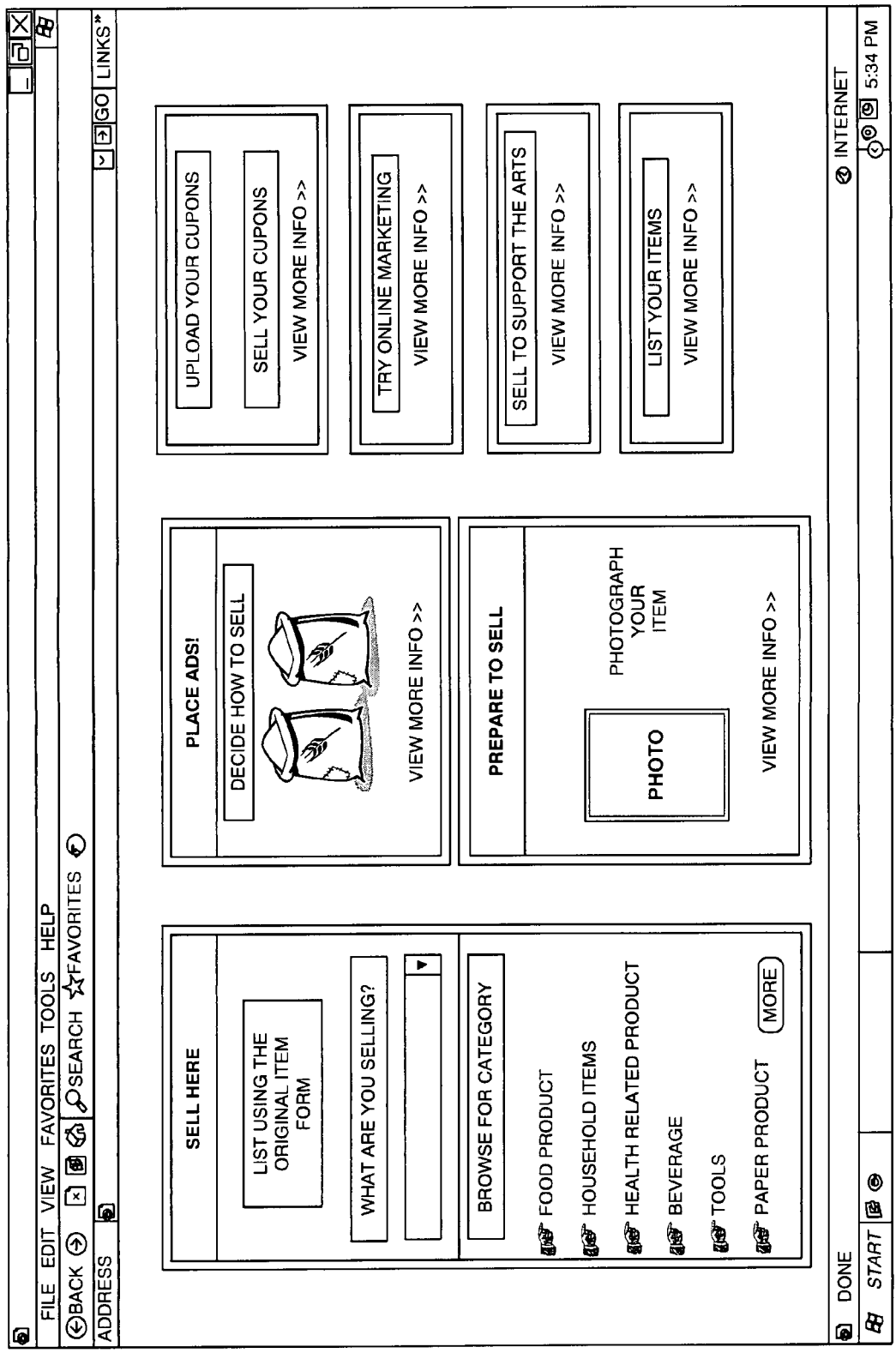
FIG. 5 is a user interface view of the advertising module of FIG. 1, according to one embodiment.

FIG. 5 is a user interface view of the advertising module 122 of FIG. 1, according to one embodiment. The user interface view 500 may enable a set of providers to sell the goods and/or services by prompting a query to update information (type, price, etc.) associated with the goods and/or services based on a category (e.g., food product, house hold items, tools, etc.) that they belong to. The user interface view 500 may enable the merchants, the distributors, and/or the advertisers to place the advertisements associated with the goods and/or services. The user interface view may facilitate the set of providers to upload recent photographs of the goods and/or services. In addition, the user interface view 500 may enable user to upload coupons associated with the goods and/or services and to sell the coupons (e.g., through a web-based network).

Figure 6:
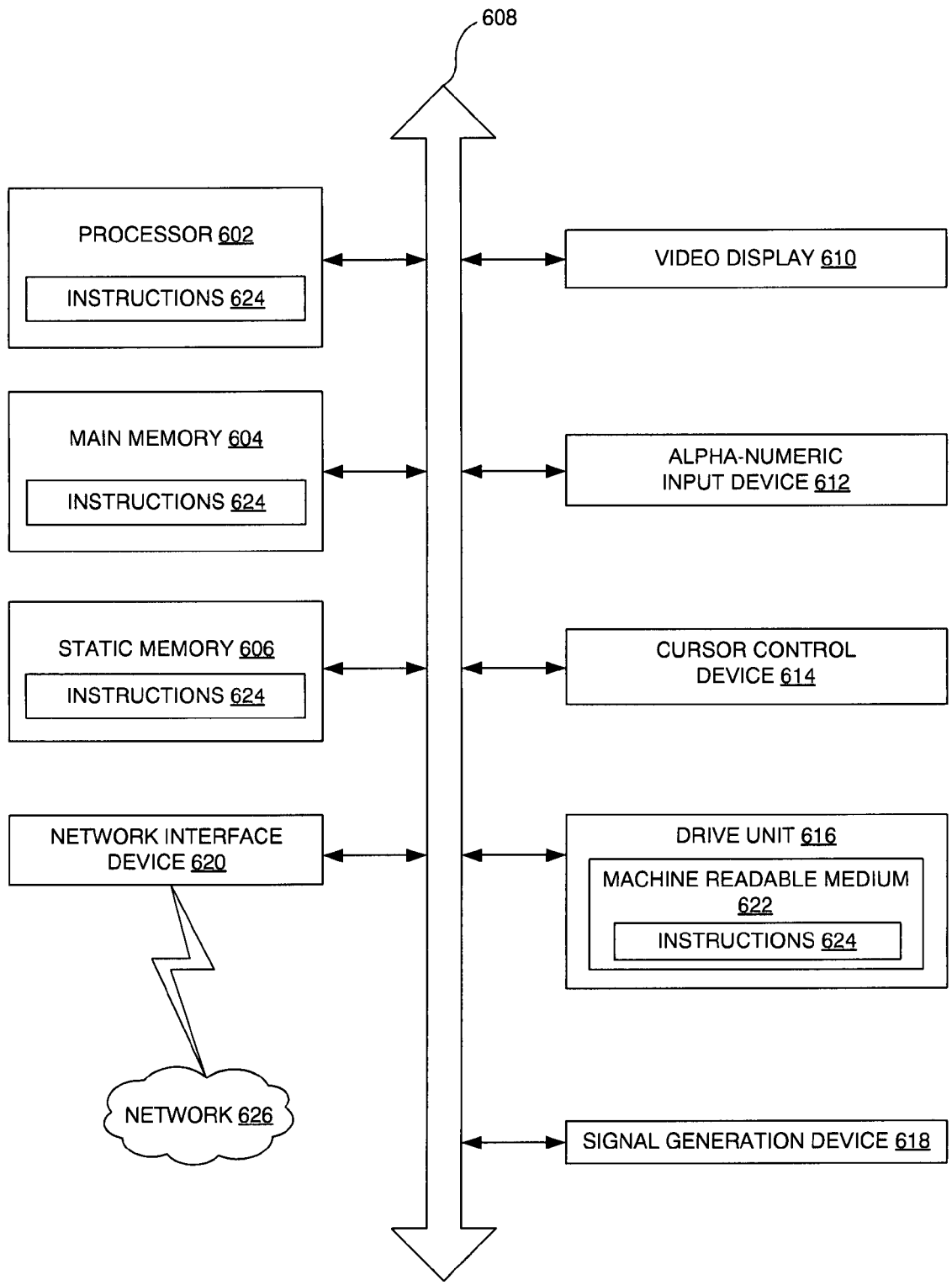
FIG. 6 is a diagrammatic system view of a data processing system in which any of the embodiments disclosed herein may be performed, according to one embodiment.

FIG. 6 is a diagrammatic system view 600 of a data processing system in which any of the embodiments disclosed herein may be performed, according to one embodiment. Particularly, the diagrammatic system view 600 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624, and a network 626, according to one embodiment.

The diagrammatic system view 600 may indicate a personal computer and/or the data processing system in which one or more operations disclosed herein are performed. The processor 602 may be a microprocessor, a state machine, an application specific integrated circuit, a field programmable gate array, etc. (e.g., Intel® Pentium® processor). The main memory 604 may be a dynamic random access memory and/or a primary memory of a computer system.

The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, a keyboard and/or any other input device of text (e.g., a special device to aid the physically handicapped). The cursor control device 614 may be a pointing device such as a mouse.

The drive unit 616 may be the hard drive, a storage system, and/or other longer term storage subsystem. The signal generation device 618 may be a bios and/or a functional operating system of the data processing system. The network interface device 620 may be a device that may perform interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one or more operations disclosed herein.

Figure 7:
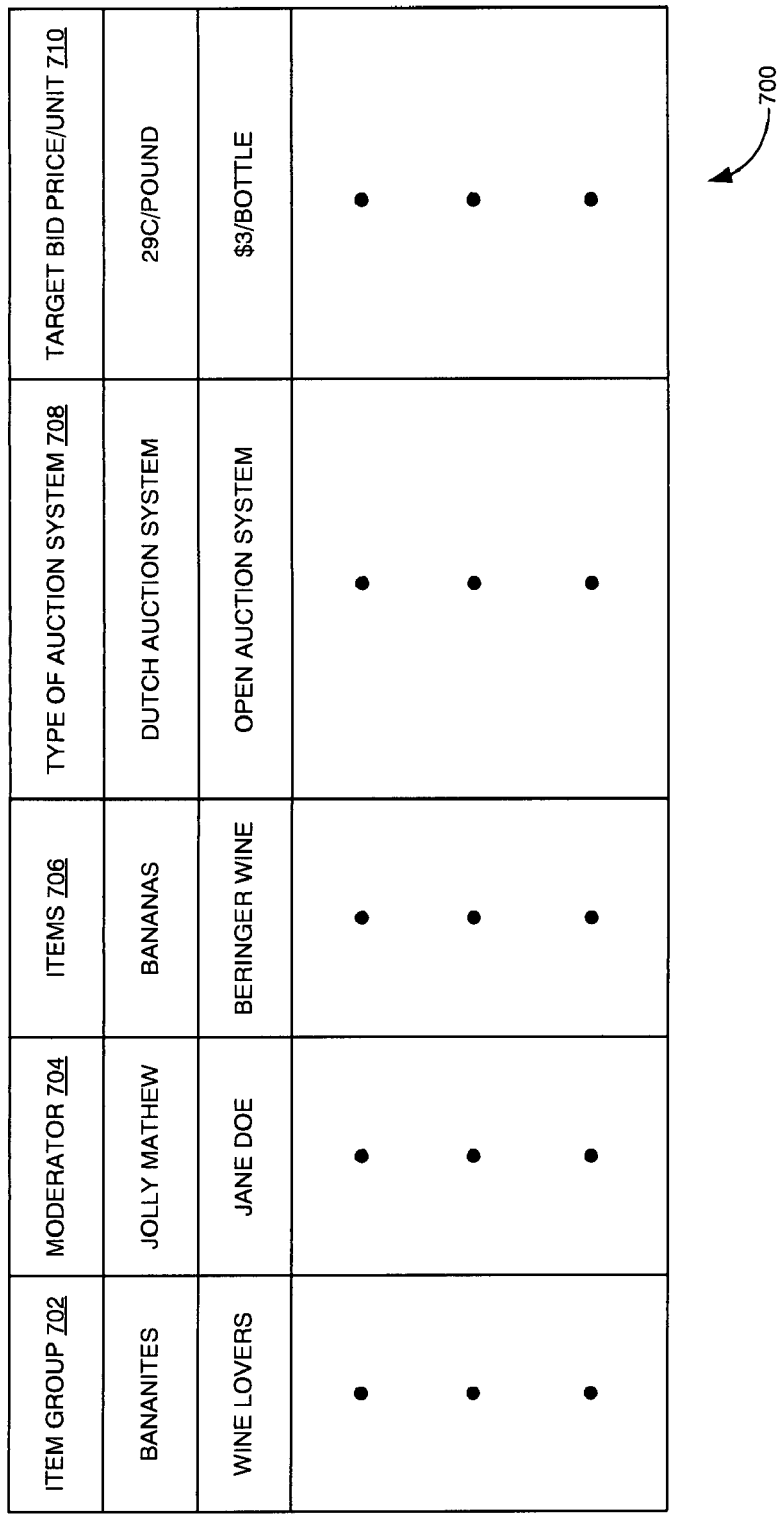
FIG. 7 is a table view of showing details of a bidding system, according to one embodiment.

FIG. 7 is a table view showing details of a bidding system, according to one embodiment. Particularly, FIG. 7 illustrates an item group field 702, a moderator field 704, an items field 706, a type of auction system field 708 and a target bid price/unit field 710.

The item group field 702 may display the name of the item group in the neighborhood of the geo-spatial social network. The moderator field 704 may display the names of the moderators of the corresponding item groups. The items field 706 may display the items for which bids are to be placed by the set of providers for providing goods and/or services to the item group and/or the neighborhood buying consortia. The type of auction system field 708 may display the auction system (e.g., the open system, the dutch system, the closed system, etc.) selected by the moderator of the item group for qualifying the providers of item(s) to the members of the item group in the geo-spatial social network. The target bid price/unit field 710 may display the monetary amount (e.g, set by the moderators for each item in the item group) based on which the set provider will place the bids.

In the example embodiment illustrated in FIG. 7, the item group field 702 displays "Bananites" in the first row and "Wine Lovers" in the second row of the item group field 702 column. The moderator field 704 displays "Jolly Mathew" in the first row and "Jane Doe" in the second row of the moderator field 704 column. The items field 706 displays "Bananas" in the first row and "Beringer Wine" in the second row of the items field 706 column.

The type of auction system field 708 shows "Dutch Auction System" in the first row and "Open Auction System" in the second row of the type of auction system field 708 column. The target bid price/unit field 710 shows "29c/Pound" in the first row and "$3/Bottle" in the second row of the target bid price/unit field 710 column.

FIG. 8 is a table view showing demand details associated with the item groups in the geo-spatial network. Particularly, FIG. 8 illustrates an item group field 802, an items field 804, a frequency data field 806, a pricing data field 808, a unit data field 810 and a time data field 812, according to one embodiment.

The item group field 802 may display the name of the item group(s) in the geo-spatial social network. The items field 804 may display the name of the items demanded by the corresponding item groups 802. The frequency data field 806 may display the periodicity of item requirements for the item groups 802. The pricing data field 808 may display the highest monetary amount which the members of the item groups 802 are willing to provide for each item. The unit data field 810 may display the quantity of the items demanded by the registered user. The time data field 812 may display the duration for which an item group is willing to commit to the purchase per the projected requirement.

In the example embodiment illustrated in FIG. 8, the item group field 802 displays "Bananites" in the first row and "Wine Lovers" in the second row of the item group field 802 column. The items field 804 displays "Bananas" in the first row and "Beringer Wine" in the second row of the items field 804 column. The frequency data field 806 displays "Bi-Weekly" in the first row and "Monthly" in the second row of the frequency data field 806 column.

The pricing data field 808 shows "29c/Pound" in the first row and "$3/Bottle" in the second row of the pricing data field 808 column. The unit data field 810 shows "6 Pounds" in the first row and "10 Crates" in the second row of the unit data field 810 column. The time data field 812 shows "12 Months" in the first row and "18 Months" in the second row of the time data field 812 column.

Figure 9A:
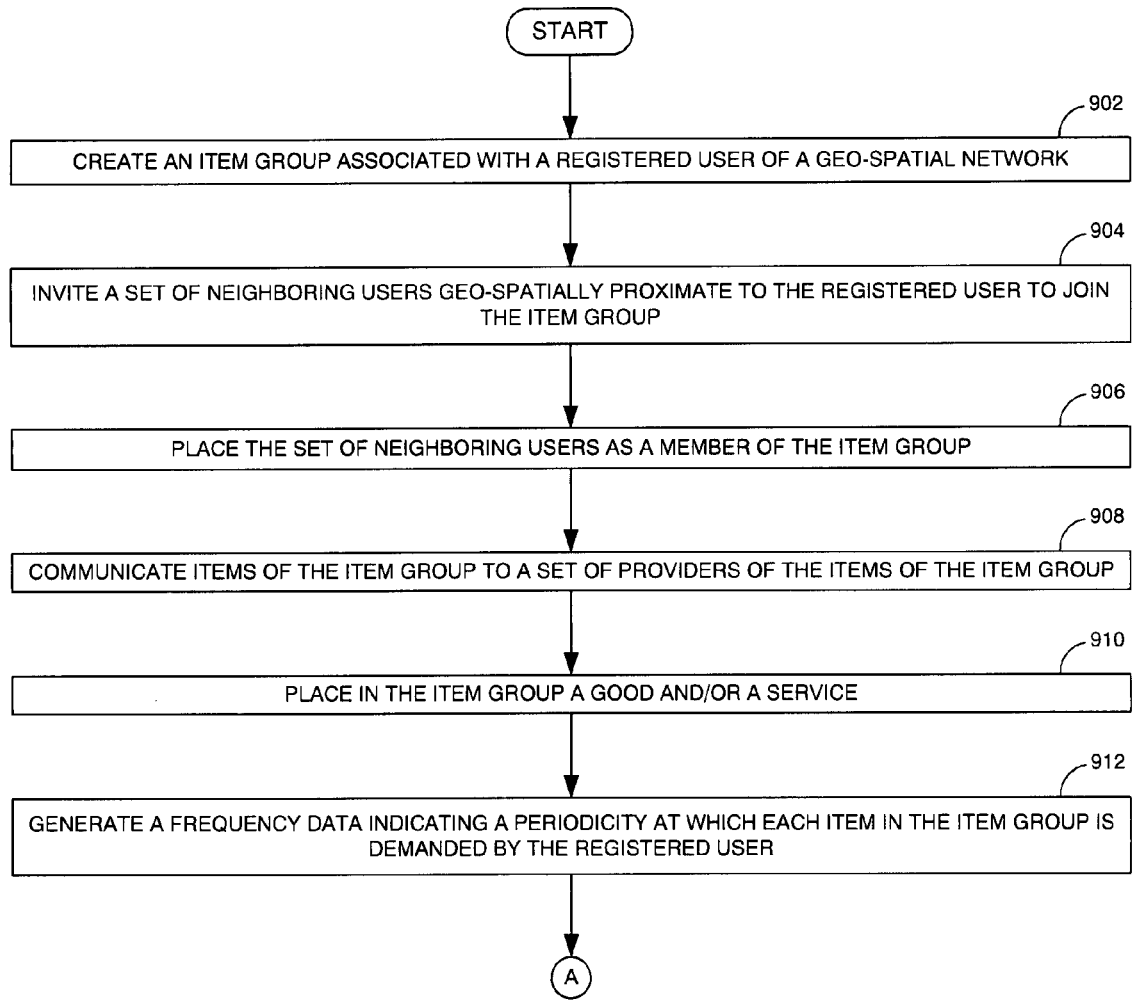
FIG. 9A is a process flow of creating an item group and communicating items of item group to a set of providers, according to one embodiment.

FIG. 9A is a process flow of creating an item group and communicating items of an item group to a set of providers, according to one embodiment. In operation 902, an item group associated with a registered user (e.g., the registered user 136 of FIG. 1) of a geo-spatial network may be created. In operation 904, a set of neighboring users geo-spatially proximate to the registered user (e.g., the registered user 136 of FIG. 1) may be invited to join the item group. In operation 906, the set of neighboring users may be placed as a member of the item group. In operation 908, items of the item group may be communicated to the set of providers of the items of the item group. In operation 910, at a good (e.g., a food product, a perishable, a consumable, a household item, a commodity, a beverage, a fruit, a bread, a meat, a paper product, a tool, a medicine, a plastic product, and/or a health related product, etc.) and/or a service (e.g., car-wash services, cleaning services, food services, and/or other residential services, etc.) may be placed in the item group. In operation 912, a frequency data may be generated indicating a periodicity at which each item in the item group is demanded by the registered user 136.

Figure 9B:
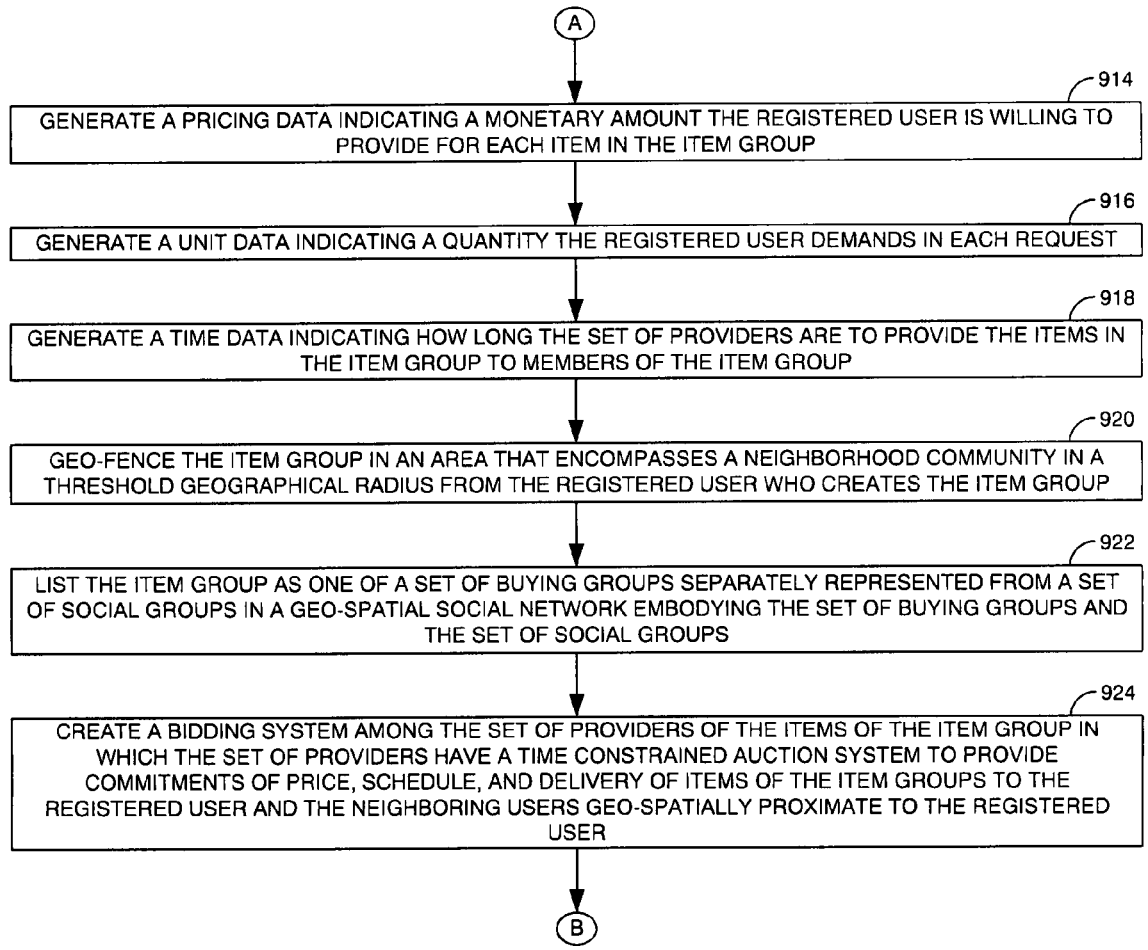
FIG. 9B is a continuation of the process flow of FIG. 9A, showing additional processes, according to one embodiment.

FIG. 9B is a continuation of the process flow of FIG. 9A, showing additional processes, according to one embodiment. In operation 914, a pricing data may be generated indicating a monetary amount the registered user 136 is willing to provide for each item in the item group. In operation 916, a unit data may be generated indicating a quantity (e.g., of the goods and/or services) the registered user 136 demands in each request.

In operation 918, a time data may be generated indicating how long the set of providers (e.g., the distributors 128 of FIG. 1) are to provide the items in the item group to members of the item group. In operation 920, the item group may be geo-fenced in an area that encompasses a neighborhood community in a threshold geographical radius (e.g., a ten mile radius) from the registered user 136 who creates the item group. In operation 922, the item group may be listed as one of a set of buying groups separately represented (e.g., through a different and/or distinct visualization) from a set of social groups in a geo-spatial social network embodying the set of buying groups and the set of social groups. In operation 924, a bidding system may be created among the set of providers of the items of the item group (e.g., using the auction module 112 of FIG. 1) in which the set of providers have a time constrained auction system to provide commitments of price, schedule, and/or delivery of items of the item groups to the registered user 136 and the neighboring users geo-spatially proximate to the registered user 136.

Figure 9C:
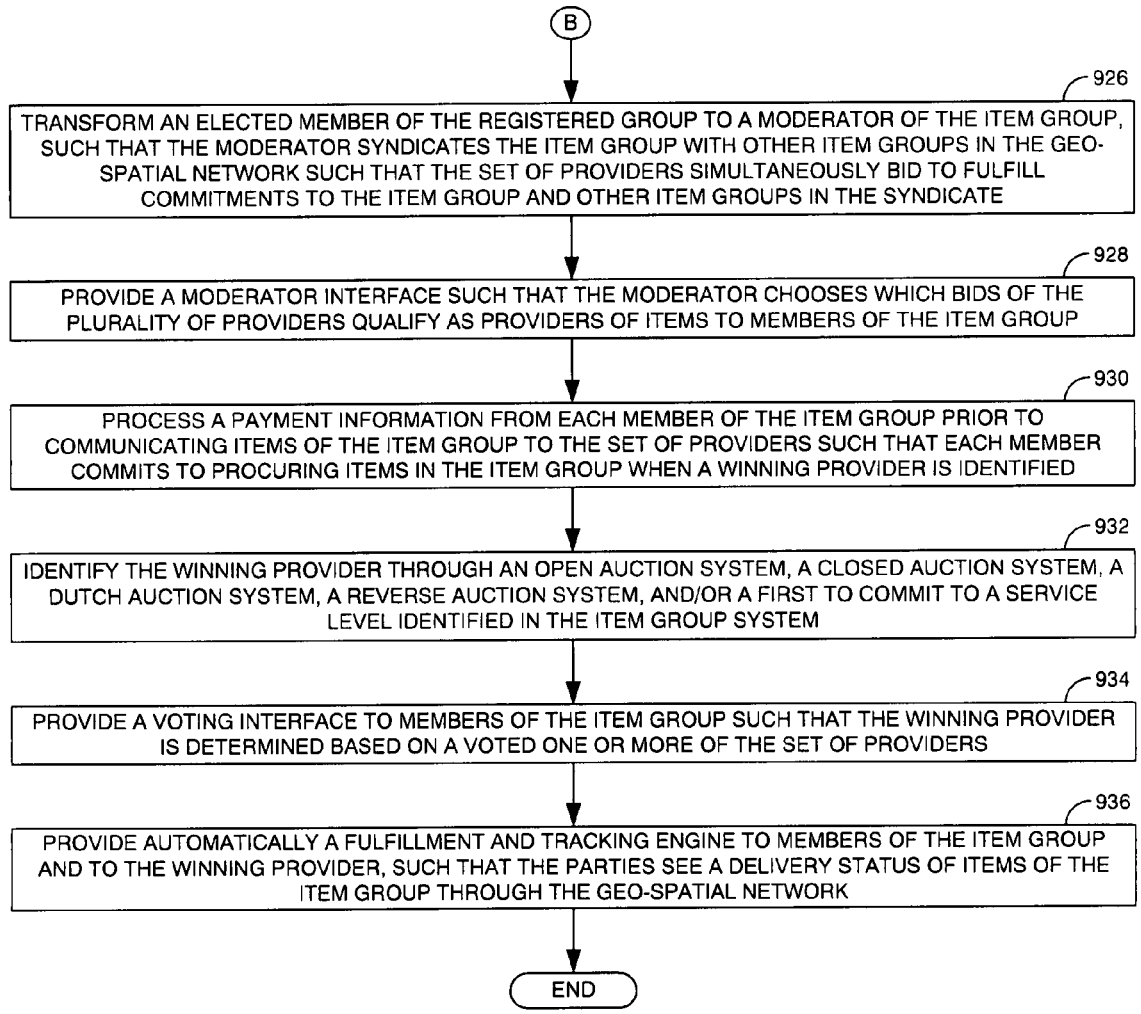
FIG. 9C is a continuation of the process flow of FIG. 9B, showing additional processes, according to one embodiment.

FIG. 9C is a continuation of the process flow of FIG. 9B, showing additional processes, according to one embodiment. In operation 926, an elected member of the item group may be transformed to a moderator of the item group (e.g., using the moderator module 104 of FIG. 1), such that the moderator syndicates the item group with other item groups in the geo-spatial network such that the set of providers (e.g., the distributors 128 of FIG. 1) simultaneously bid to fulfill commitments to the item group and other item groups in the syndicate. In operation 928, a moderator interface may be provided (e.g., using the moderator module 104 of FIG. 1) such that the moderator chooses which bids of the number of providers qualify as providers of items to members of the item group.

In operation 930, a payment information may be processed from each member of the item group prior to communicating items of the item group to the set of providers such that each member commits to procuring items in the items group when a winning provider is identified (e.g., using the demand aggregation module 100 of FIG. 1). In operation 932, the winning provider may be identified through an open auction system, a closed auction system, a dutch auction system, a reverse auction system, and/or a first to commit to a service level identified in the item group system (e.g., through the auction module 112 of FIG. 1).

In operation 934, a voting interface may be provided to members of the item group such that the winning provider is determined based on a voted one or more of the set of providers (e.g., using the voting module 116 of FIG. 1). In operation 936, a fulfillment and tracking engine may be provided automatically to members of the item group and to the winning provider, such that the parties see a delivery status of items of the item group through the geo-spatial network.

Figure 10:
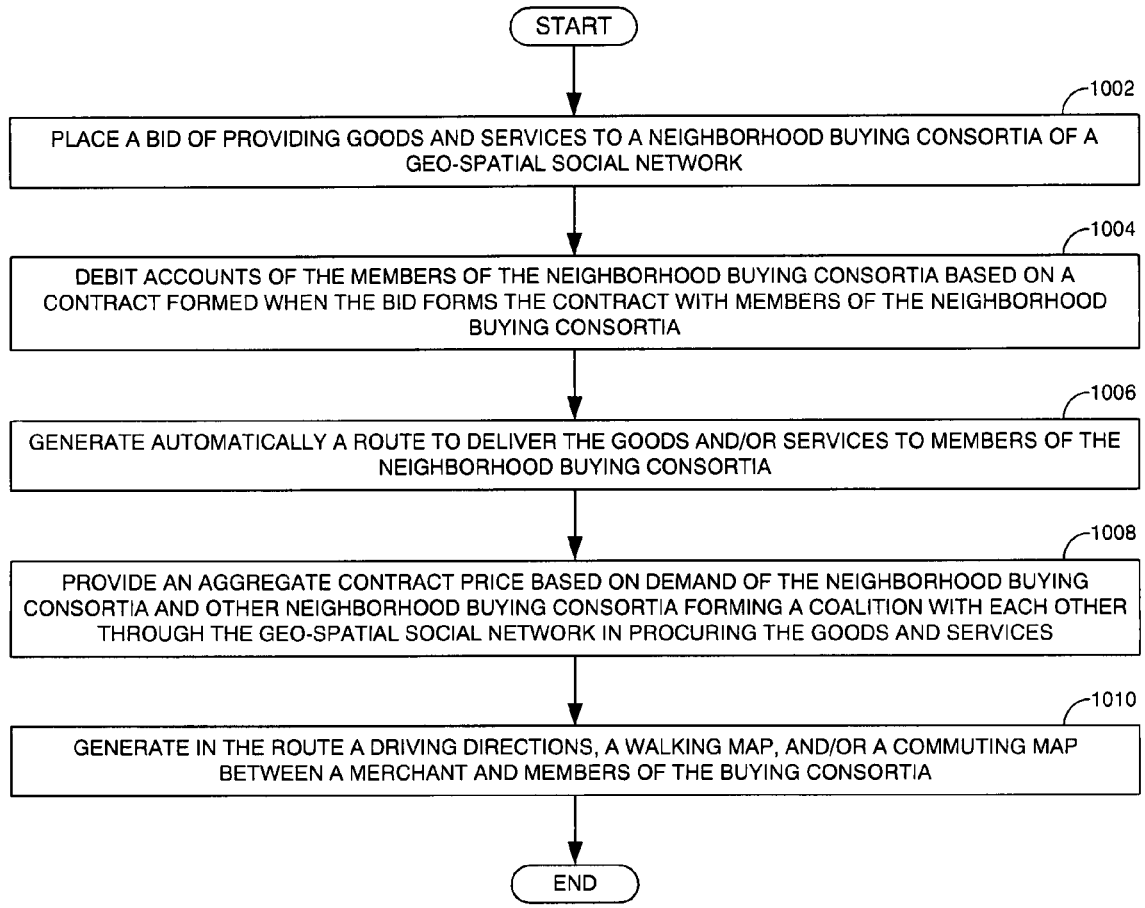
FIG. 10 is a process flow of placing a bid of providing the goods and/or services to a neighborhood buying consortia, according to one embodiment. Other features of the present embodiments will be apparent from the accompanying drawings and from the detailed description that follows.

FIG. 10 is a process flow of placing a bid of providing goods and/or services to a neighborhood buying consortia, according to one embodiment. In operation 1002, a bid of providing goods and services may be placed (e.g., using the demand aggregation module 100 of FIG. 1) to a neighborhood buying consortia of a geo-spatial social network. In operation 1004, accounts of the members of the neighborhood buying consortia may be debited based on a contract formed when the bid forms a contract with members of the neighborhood buying consortia.

In operation 1006, a route to deliver the goods and/or services to members of the neighborhood buying consortia may be generated automatically (e.g., using the distribution module 120 of FIG. 1). In operation 1008, an aggregate contract price may be provided based on demand of the neighborhood buying consortia and other neighborhood buying consortia forming a coalition with each other through the geo-spatial social network in procuring the goods and services. In operation 1010, driving directions, a walking map, and/or a commuting map between a merchant and members of the buying consortia may be generated in the route (e.g., using the map module 106 of FIG. 1).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and electrical circuits (e.g., application specific integrated ASIC circuitry and/or in Digital Signal; Processor DSP circuitry). For example, the demand aggregation module 100, the commodity module 102, the moderator module 104, the map module 106, the geo-fencing module 108, the search module 110, the auction module 112, the wiki module 114, the voting module 116, the item module 118, the distribution module 120, the advertising module 122, the customer grouping module 124, the service module 126 and the other modules of FIGS. 1-14 may be enabled using a demand aggregation circuit, a commodity circuit, a moderator circuit, a map circuit, a geofencing circuit, a search circuit, an auction circuit, a wiki circuit, a voting circuit, an item circuit, a distribution circuit, an advertisement circuit, a customer grouping circuit, a service circuit and other circuits using one or more of the technologies described herein. In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A computer-implemented method comprising:
    creating an item group associated with a registered user of a geo-spatial network;
    inviting a set of neighboring users geo-spatially proximate to the registered user to join the item group;
    placing at least one of the set of neighboring users as a member of the item group;
    communicating items of the item group to a set of providers of the items of the item group;
    automatically providing, by a computer, a fulfillment and tracking engine to members of the item group, such that the parties see a delivery status of items of the item group through the geo-spatial network, wherein the fulfillment is provided to at least one of a central depot in a neighborhood location convenient to members of the item group and to individual residences of members of the item group;
    placing in the item group at least one of a good and a service;
    generating a frequency data indicating a periodicity at which each item in the item group is demanded by the registered user;
    generating a pricing data indicating a monetary amount the registered user is willing to provide for each item in the item group;
    generating a unit data indicating a quantity the registered user demands in each request; and
    generating a time data indicating how long the set of providers are to provide the items in the item group to members of the item group.

2. The method of claim 1, wherein the good is at least one of a food product, a perishable, a consumable, a household item, a commodity, a beverage, a fruit, a bread, a meat, a paper product, a tool, a medicine, a plastic product, and a health related product, and wherein the service includes at least one of car-wash service, cleaning service, food service, and other residential services.

3. The method of claim 1 further comprising geo-fencing the item group in an area that encompasses a neighborhood community in a threshold geographical radius from the registered user who creates the item group.

4. The method of claim 3 wherein the geo-fencing is constrained to a street, a neighborhood, a city, and a county.

5. The method of claim 1 further comprising listing the item group as one of a set of buying groups separately represented from a set of social groups in a geo-spatial social network embodying the set of buying groups and the set of social groups.

6. The method of claim 1 further comprising creating a bidding system among the set of providers of the items of the item group in which the set of providers have a time constrained auction system to provide commitments of price, schedule, and delivery of items of the item groups to the registered user and the at least one of the neighboring users geo-spatially proximate to the registered user.

7. The method of claim 1 further comprising transforming an elected member of the item group to a moderator of the item group, such that the moderator syndicates the item group with other item groups in the geo-spatial network such that the set of providers simultaneously bid to fulfill commitments to the item group and other item groups in the syndicate.

8. The method of claim 7 further comprising providing a moderator interface such that the moderator chooses which bids of the plurality of providers qualify as providers of items to members of the item group.

9. The method of claim 1 further comprising processing a payment information from each member of the item group prior to communicating items of the item group to the set of providers such that each member commits to procuring items in the item group when a winning provider is identified.

10. The method of claim 9 further comprising identifying the winning provider through at least one of an open auction system, a closed auction system, a dutch auction system, a reverse auction system, and a first to commit to a service level identified in the item group system.

11. The method of claim 9 further comprising providing a voting interface to members of the item group such that the winning provider is determined based on a voted one or more of the set of providers.

12. A non-transitory computer readable storage medium embodying a set of instructions that, when executed by a machine, causes the machine to perform:
    creating an item group associated with a registered user of a geo-spatial network;
    inviting a set of neighboring users geo-spatially proximate to the registered user to join the item group;
    placing at least one of the set of neighboring users as a member of the item group;
    communicating items of the item group to a set of providers of the items of the item group;
    automatically providing a fulfillment and tracking engine to members of the item group, such that the parties see a delivery status of items of the item group through the geo-spatial network, wherein the fulfillment is provided to at least one of a central depot in a neighborhood location convenient to members of the item group and to individual residences of members of the item group;
    processing a payment information from each member of the item group prior to communicating the items of the item group to the set of providers such that each member commits to procuring the items in the item group when a winning provider is identified; and
    providing a voting interface to members of the item group such that the winning provider is determined based on a voted one or more of the set of providers.

* * * * *

UNITED STATES PATENT AND TRADEMARK OFFICE
CERTIFICATE OF CORRECTION

PATENT NO. : 8,095,430 B2
APPLICATION NO. : 11/784137
DATED : January 10, 2012
INVENTOR(S) : Raj Vasant Abhyanker Page 1 of 1

It is certified that error appears in the above-identified patent and that said Letters Patent is hereby corrected as shown below:

On Title page, field (56), under "OTHER PUBLICATIONS", in column 2, line 1, delete "FlletView" and insert -- FleetView --, therefor.

On Title page, field (57), under "ABSTRACT", in column 2, line 9, delete "includes" and insert -- include --, therefor.

Signed and Sealed this
Twenty-eighth Day of February, 2012

David J. Kappos
*Director of the United States Patent and Trademark Office*